(12) United States Patent
Bhattad et al.

(10) Patent No.: US 9,344,246 B2
(45) Date of Patent: May 17, 2016

(54) REFERENCE SIGNAL CONFIGURATION AND RELAY DOWNLINK CONTROL CHANNEL

(75) Inventors: Kapil Bhattad, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 13/267,715

(22) Filed: Oct. 6, 2011

(65) Prior Publication Data

US 2012/0087299 A1    Apr. 12, 2012

Related U.S. Application Data

(60) Provisional application No. 61/391,419, filed on Oct. 8, 2010.

(51) Int. Cl.
*H04B 7/14*       (2006.01)
*H04L 5/00*       (2006.01)
(Continued)

(52) U.S. Cl.
CPC ............ *H04L 5/0051* (2013.01); *H04L 5/0053* (2013.01); *H04L 5/0094* (2013.01); *H04B 7/2606* (2013.01); *H04L 5/0023* (2013.01); *H04W 84/047* (2013.01)

(58) Field of Classification Search
CPC ..... H04W 24/00; H04W 88/04; H04W 72/04; H04W 88/08; H04W 84/08; H04W 76/02; H04W 84/047; H04B 7/2606; H04B 7/18539; H04B 7/15542; H04L 5/003; H04L 5/0003; H04L 5/006; H04L 5/0035; H04L 5/0057; H04L 5/0053; H04L 5/0044; H04L 5/0051; H04L 5/0023; H04L 5/0094
USPC .................................. 370/252, 315, 329, 341
See application file for complete search history.

(56) References Cited

U.S. PATENT DOCUMENTS 8,005,175 B2 *  8/2011  Yang et al. .................... 375/346
8,073,428 B2 * 12/2011  Khetawat et al. ............. 455/411

(Continued)

FOREIGN PATENT DOCUMENTS

CN           1881867 A        12/2006
JP        2012021018 A         2/2012

(Continued)

OTHER PUBLICATIONS

Huawei et al: "Proposal for specification of PDSCH Muting", 3GPP Draft; R1-105132, 3rd Generation Partnership Project (3GPP), Mobile Competence Centre ; 650, Route Des Lucioles ; F-06921 Sophia-Antipolis Cedex ; France, vol. RAN WG1, No. Xi 'an; Oct. 11, 2010, Oct. 5, 2010, XP050450353, [retrieved on Oct. 5, 2010] Sections 1-2.

(Continued)

*Primary Examiner* — Brian O'Connor
(74) *Attorney, Agent, or Firm* — Patterson & Sheridan, LLP

(57) ABSTRACT

Aspects of the present disclosure relate to methods for allowing a relay base station to more efficiently decode relay control information transmitted from a donor base station. A relay base station may determine a configuration of resource elements used for transmission of reference signals and decode sets of resource elements based on the configuration of reference signals. According to aspects, a donor base station may transmit relay control information in a data portion of a subframe based on the configuration of reference signals transmitted by the donor base station.

44 Claims, 9 Drawing Sheets

(51) Int. Cl.
*H04B 7/26* (2006.01)
*H04W 84/04* (2009.01)

(56) References Cited

U.S. PATENT DOCUMENTS

| | | | | |
|---|---|---|---|---|
| 8,095,143 B2* | 1/2012 | Amirijoo et al. | ........... | 455/452.1 |
| 8,134,944 B2* | 3/2012 | Kang et al. | .................... | 370/315 |
| 8,145,252 B2* | 3/2012 | Sung et al. | .................... | 455/522 |
| 8,150,397 B2* | 4/2012 | Khetawat et al. | ............ | 455/436 |
| 8,208,434 B2* | 6/2012 | Sayana et al. | ................ | 370/329 |
| 8,305,987 B2* | 11/2012 | Fong et al. | .................... | 370/329 |
| 2007/0206623 A1* | 9/2007 | Tiedemann et al. | .......... | 370/431 |
| 2007/0223606 A1* | 9/2007 | Yang et al. | .................... | 375/260 |
| 2008/0057996 A1* | 3/2008 | Sung et al. | .................... | 455/522 |
| 2010/0069065 A1* | 3/2010 | Sambhwani et al. | ......... | 455/434 |
| 2010/0120442 A1 | 5/2010 | Zhuang et al. | | |
| 2010/0297936 A1* | 11/2010 | Nan | ................................ | 455/7 |
| 2011/0044391 A1 | 2/2011 | Ji et al. | | |
| 2011/0051654 A1 | 3/2011 | Blankenship et al. | | |
| 2011/0164550 A1 | 7/2011 | Chen et al. | | |
| 2011/0170435 A1 | 7/2011 | Kim et al. | | |
| 2011/0170496 A1* | 7/2011 | Fong et al. | .................... | 370/329 |
| 2011/0199986 A1* | 8/2011 | Fong et al. | .................... | 370/329 |
| 2012/0051277 A1* | 3/2012 | Li et al. | ......................... | 370/312 |
| 2012/0113917 A1* | 5/2012 | Gaal et al. | ..................... | 370/329 |
| 2012/0170508 A1* | 7/2012 | Sawai | ........................... | 370/315 |
| 2012/0329400 A1* | 12/2012 | Seo et al. | ..................... | 455/63.1 |
| 2013/0182583 A1* | 7/2013 | Siomina et al. | ............... | 370/252 |

FOREIGN PATENT DOCUMENTS

| | | |
|---|---|---|
| JP | 2013529869 A | 7/2013 |
| WO | WO2011093671 A2 | 8/2011 |
| WO | WO-2011160926 A1 | 12/2011 |

OTHER PUBLICATIONS

Motorola: "Remaining Aspects and Signaling of PDSCH RE Muting", 3GPP Draft; R1-105617 Remaining Aspects of Muting and Related Signalling (Final Clean), 3rd Generation Partnership Project (3GPP), Mobile Competence Centre ; 650, Route Des Lucioles ; F-06921 Sophia-Antipolis Cedex ; France, vol. RAN WG1, No. Xis an, China; Oct. 2010, Oct. 14, 2010, XP050489317, [retrieved on Oct. 14, 2010] section 3.
Texas Instruments: "Signaling for PDSCH Muting in Rel-10", 3GPP Draft; R1-105283 TI Signaling for PDSCH Muting, 3rd Generation Partnership Project (3GPP), Mobile Competence Centre ; 650, Route Des Lucioles ; F-06921 Sophia-Antipolis Cedex ; France, vol. RAN WG1, No. Xi 'an; Oct. 11, 2010, Oct. 5, 2010, XP050450455, [retrieved on Oct. 5, 2010] section 2.
Texas Instruments: "PDSCH Muting Considerations on CSI-RS for Rel-10 LTE", 3GPP Draft; R1-104470 TI Muting Considerations for CSI-RS, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; Aug. 23, 2010, Aug. 17, 2010, XP050449796, [retrieved on Aug. 17, 2010] sections 1 & 3.1.
ZTE: "Radio link monitoring in non-CA based heterogeneous deployments", 3GPP Draft; R1-105465, 3rd Generation Partnership Project (3GPP), Mobile Competence Centre ; 650, Route Des Lucioles ; F-06921 Sophia-Antipolis Cedex . ; France, vol. RAN WG1, No. Xi 'an; Oct. 11, 2010, Oct. 5, 2010, XP050450587, [retrieved on Oct. 5, 2010] sections 3.
3rd Generation Partnership Project; Technical Specification Group Radio Access Network; Evolved Universal Terrestrial Radio Access (E-UTRA); Physical layer for relaying operation (Release 10), 3GPP Standard; 3GPP TS 36.216, 3rd Generation, Partnership Project (3GPP), Mobile Competence Centre, 650, Route Des Lucioles, F-06921 Sophia-Antipolis Cedex, France, No. V1.0.0, Sep. 22, 2010 , pp. 1-12, XP050442197, [retrieved on Sep. 22, 2010].
Huawei et al., "Remaining issues on CSI RS signalling", 3GPP Draft; R1-105131, 3rd Generation Partnership Project (3GPP), Mobile Competence Centre, 650, Route Des Lucioles, F-06921 Soph ia-Anti poll s Cedex, France, vol. RAN WG1, No. X i 'an; Oct. 11, 2010, Oct. 5, 2010, XP050450352, [retrieved on Oct. 5, 2010].
International Search Report and Written Opinion—PCT/US2011/055230—ISA/EPO—Dec. 14, 2011.
NEC Group: "Remaining issues of the R-PDCCH interleaving for Type 1 Relay nodes", 3GPP Draft, R1-105420, 3rd Generation Partnership Project (3GPP), Mobile Competence Centre, 650, Route Des Lucioles, F-06921 Sophia-Anti polis Cedex, France, vol. RAN WG1, No. X i 'an, Oct. 11, 2010, Oct. 5, 2010, XP050450557, [retrieved on Oct. 5, 2010].
New Postcom: "Downlink CSI-RS signaling design for LTE-Advanced", 3GPP Draft; R1-105035, 3rd Generation Partnership Project (3GPP), Mobile Competence Centre, 650, Route Des Lucioles, F-06921 Sophia-Anti polis Cedex, France, vol. RAN WG1, No. Madrid, Spain, Aug. 23, 2010, Aug. 27, 2010, XP050450287, [retrieved on Aug. 27, 2010].
Qualcomm Incorporated: "Finalizing Signaling and Configuration of CSI-RS", 3GPP Draft; R1-105565 Finalizing Signaling and Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, No. Xian; Oct. 11, 2010, Oct. 5, 2010, XP050450663, [retrieved on Oct. 5, 2010].
Bonneville, et al., "Advanced Relay Technical Proposals," Artist4G, Seventh Framework Program, Feb. 2011, pp. 1-161.
Yuan, et al., "Relay Backhaul Subframe Allocation in LTE-Advanced for TDD," Proceedings from ICST '10: The 5th International ICST Conference on Communications and Networking in China (Chinacom), pp. 1-5.
Alcatel-Lucent, Alcatel-Lucent Shanghai Bell, "Physical Layer Procedure for muting for CSI-RS for inter-cell measurements for Rel-10 UEs", [online], 3GPP TSG RAN WG1 Meeting #62, R1-104394, http://www.3gpp.org/ftp/tsg_ran/WG1_RL1/TSGR1_62/Docs/R1-104394.zip, pp. 1-3, Aug. 2010.
Ericsson, ST-Ericsson, "Further views on Muting", [online], 3GPP TSG-RAN WG1 #62bis, Oct. 11, 2010, R1-105323, URL: http://www.3gpp.org/ftp/tsg_rl1/TSGR1_62b/Docs/R1-105323.zip, pp. 1-3.
New Postcom., "Design of PDSCH muting for CSI-RS in LTE-Advanced", [online],3GPP TSG RAN WG1 Meeting #62bis, Xi'an, China, Oct. 11-15, 2010, R1-105223, URL: http://www.3gpp.org/ftp/tsg_ran/wg1_rl1/TSGR1_62b/Docs/R1-105223.zip, pp. 1-5.
Nokia Siemens Networks, Nokia, "PDSCH RE muting for CSI-RS", [online], 3GPP TSG-RAN WG1 Meeting #62bis, Oct. 11, 2010, R1-105529, URL: http://www.3gpp.org/ftp/tsg_ran/wg1_rl1/TSGR1_62b/Docs/R1-105529.zip, pp. 1-6.
NTT DoCoMo, "DL RS RAN1 Chairman's Notes", [online], 3GPP TSG RAN WG1 Meeting #62 bis, R1-105803, URL: http://www.3gpp.org/ftp/tsg_ran/wg1_rl1/TSGR1_62b/Docs/R1-105803.zip, pp. 1-4.
Ohwatari Y., et al., "Investigation on Improvement of Channel Estimation Accuracy with Data Signal Muting for Downlink Coordinated Multiple-Point Transmission and Reception in LTE-Advanced", IEICE Technical Report, vol. 110, No. 251, Oct. 27, 2010, pp. 1-7.
Texas Instruments , "Signaling for PDSCH Muting in Rel-10", [online], ,3GPP TSG RAN WG1 #62bis, Oct. 11, 2010, R1-105283, Retreived from the Internt: http://www.3gpp.org/ftp/tsg_ran/wg1_rl1/TSGR1_62b/Docs/R1-105283.zip, pp. 1-7.
www.3gpp.org -/ftp/tsg_ran/wg1_rl1/TSGR1_62b/Docs/"[online], [Apr. 22, 2014], Internet: URL, http://www.3gpp.org/ftp/tsg_ran/wg1_rl1/TSGR1_62b/Docs/.
www.3gpp.org-/ftp/tsg_ran/WG1_RL1/TSGR1_62/Docs/", [online] Apr. 22, 2014, Internet URL: http://www.3gpp.org/ftp/tsg_ran/WG1_RL1/TSGR1_62/Docs/.

* cited by examiner

REFERENCE SIGNAL CONFIGURATION AND RELAY DOWNLINK CONTROL CHANNEL

CROSS-REFERENCE TO RELATED APPLICATIONS

This application claims benefit of U.S. Provisional Patent Application Ser. No. 61/391,419, filed Oct. 8, 2010, which is herein incorporated by reference.

TECHNICAL FIELD

Certain embodiments of the present disclosure generally relate to wireless communication and, more particularly, to decoding relay control information based on a configuration of resource elements used for transmission of reference signals by a donor base station.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link. The relay base station may, thus, be used to supplement a coverage area and help fill "coverage holes."

SUMMARY

Certain aspects of the present disclosure provide a method for wireless communication. The method generally determining, at a relay node, a configuration of resource elements (REs) used for at least one of transmission of channel state information-reference signals (CSI-RS) or muting by a donor base station, and decoding sets of REs for relay control information transmitted from the donor base station, wherein the sets of REs are determined based, at least in part, on the configuration.

Certain aspects of the present disclosure provide a method for wireless communication. The method generally includes signaling, to a relay node, a configuration of resource elements (REs) used for at least one of transmission of channel station information-reference signals (CSI-RS) or muting by a donor base station, and transmitting, to the relay node, relay control information in a data portion of the subframe based on the configuration of REs.

Certain aspects of the present disclosure provide an apparatus for wireless communication. The apparatus generally includes means for determining, at a relay node, a configuration of resource elements (REs) used for at least one of transmission of channel state information-reference signals (CSI-RS) or muting by a donor base station, and means for decoding sets of REs for relay control information transmitted from the donor base station, wherein the sets of REs are determined based, at least in part, on the configuration.

Certain aspects of the present disclosure provide an apparatus for wireless communication. The apparatus generally includes means for signaling, to a relay node, a configuration of resource elements (REs) used for at least one of transmission of channel station information-reference signals (CSI-RS) or muting by a donor base station, and means for transmitting, to the relay node, relay control information in a data portion of the subframe based on the configuration of REs.

Certain aspects of the present disclosure provide an apparatus for wireless communication. The apparatus generally includes at least one processor and a memory coupled to the at least one processor. The at least one processor is typically adapted to determine, at a relay node, a configuration of resource elements (REs) used for at least one of transmission of channel state information-reference signals (CSI-RS) or muting by a donor base station, and decode sets of REs for relay control information transmitted from the donor base station, wherein the sets of REs are determined based, at least in part, on the configuration.

Certain aspects of the present disclosure provide an apparatus for wireless communication. The apparatus generally includes at least one processor and a memory coupled to the at least one processor. The at least one processor is typically adapted to signal, to a relay node, a configuration of resource elements (REs) used for at least one of transmission of channel station information-reference signals (CSI-RS) or muting by a donor base station, and transmit, to the relay node, relay control information in a data portion of the subframe based on the configuration of REs.

Certain embodiments provide a computer-program product for wireless communications, comprising a computer readable medium having instructions stored thereon, the instructions being executable by one or more processors. The instructions generally include instructions for determining, at a relay node, a configuration of resource elements (REs) used for at least one of transmission of channel state information-reference signals (CSI-RS) or muting by a donor base station, and decoding sets of REs for relay control information transmitted from the donor base station, wherein the sets of REs are determined based, at least in part, on the configuration.

Certain embodiments provide a computer-program product for wireless communications, comprising a computer readable medium having instructions stored thereon, the instructions being executable by one or more processors. The instructions generally include instructions for signaling, to a relay node, a configuration of resource elements (REs) used for at least one of transmission of channel station information-reference signals (CSI-RS) or muting by a donor base station, and transmitting, to the relay node, relay control information in a data portion of the subframe based on the configuration of REs.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Certain aspects of the present disclosure take advantage of the use of configurations that indicate what resources are used by a donor base station for special purposes, such as transmitting reference signals or muting (refraining from transmission). A device, such as a relay node, may utilize information about the configurations to assist in decoding control channel information.

For example, a relay station may assume that resources either actually used or available for these special purposes are not used to transmit the control channel information. As a result, the number of decoding candidates the relay station must consider may be greatly reduced, which may lead to more efficient control channel detection and decoding.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
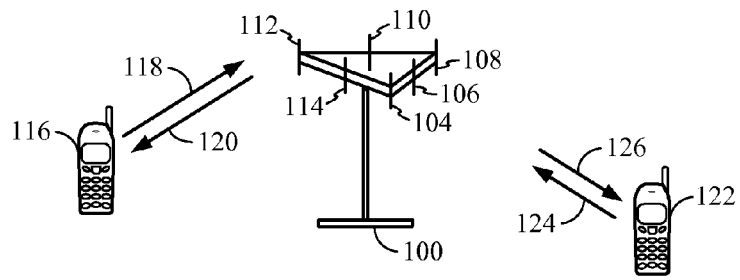
FIG. 1 illustrates a multiple access wireless communication system, according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
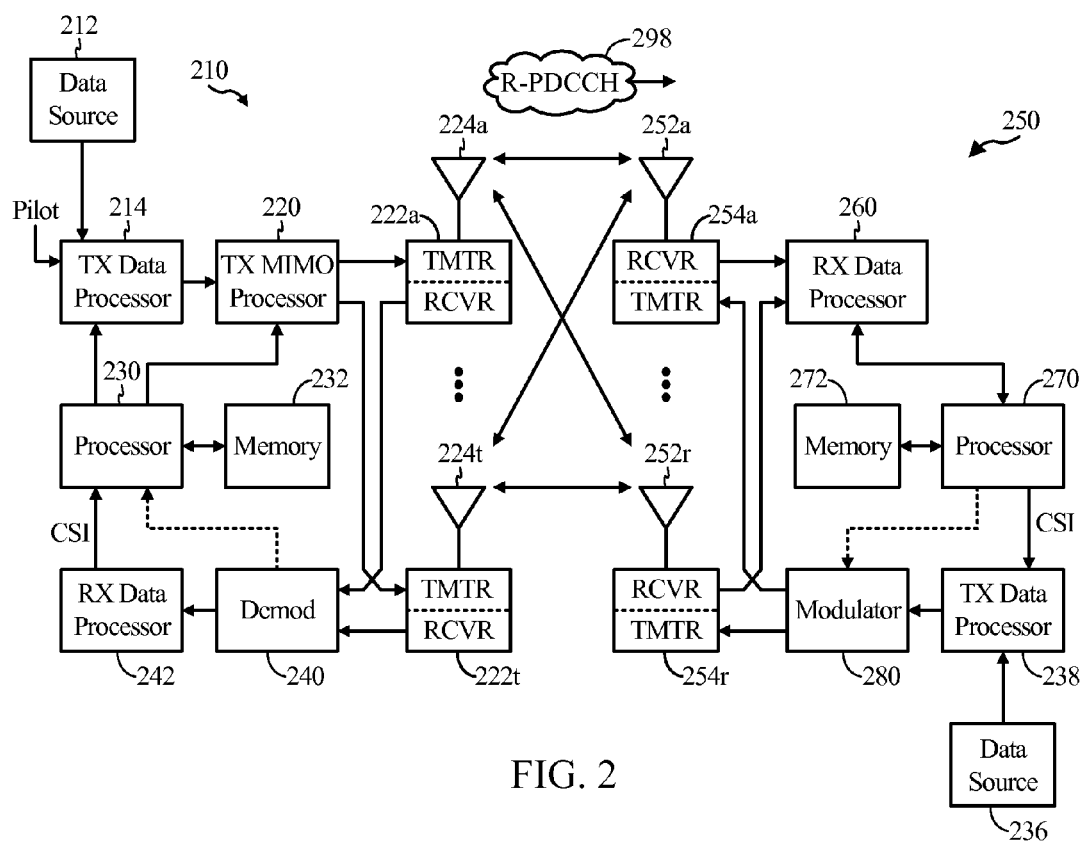
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively. The transmitted modulated signals may indicate control information for a relay node, such as a Relay Physical Downlink Control Channel (R-PDCCH) 298, as illustrated in FIG. 2.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control- CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
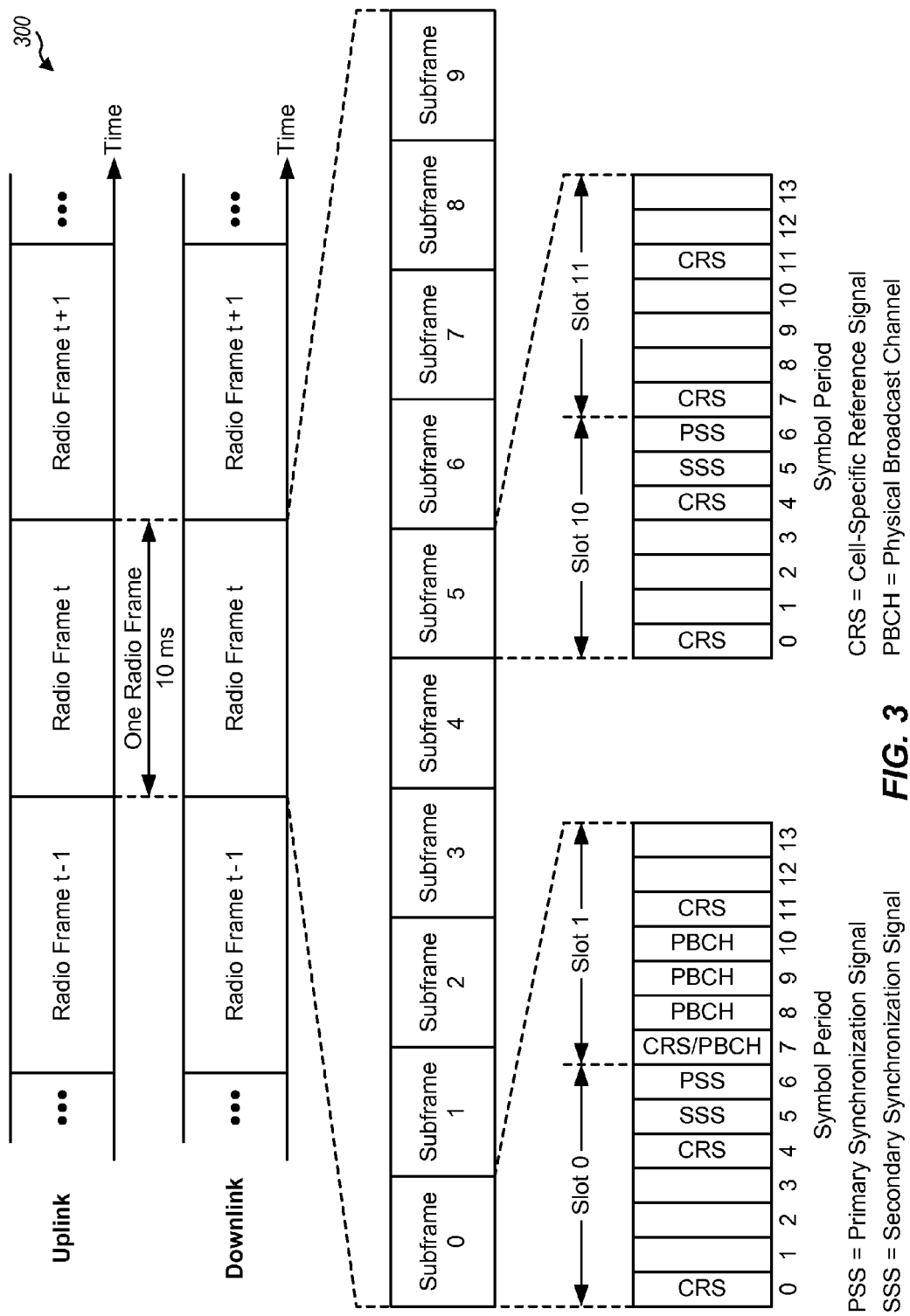
FIG. 3 illustrates an example frame structure, according to an aspect of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
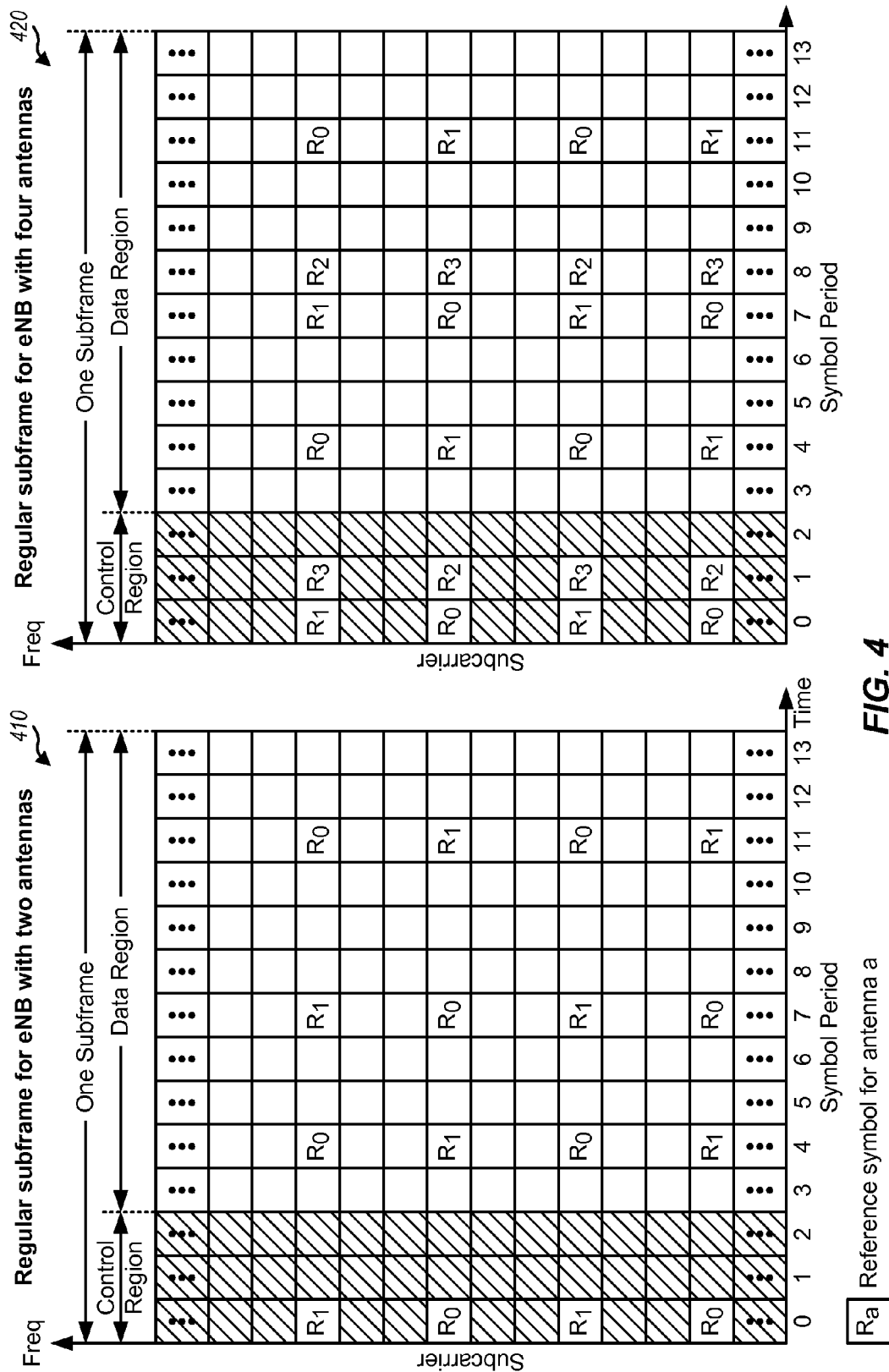
FIG. 4 illustrates an example subframe resource element mapping, according to an aspect of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An Example Relay System

Figure 5:
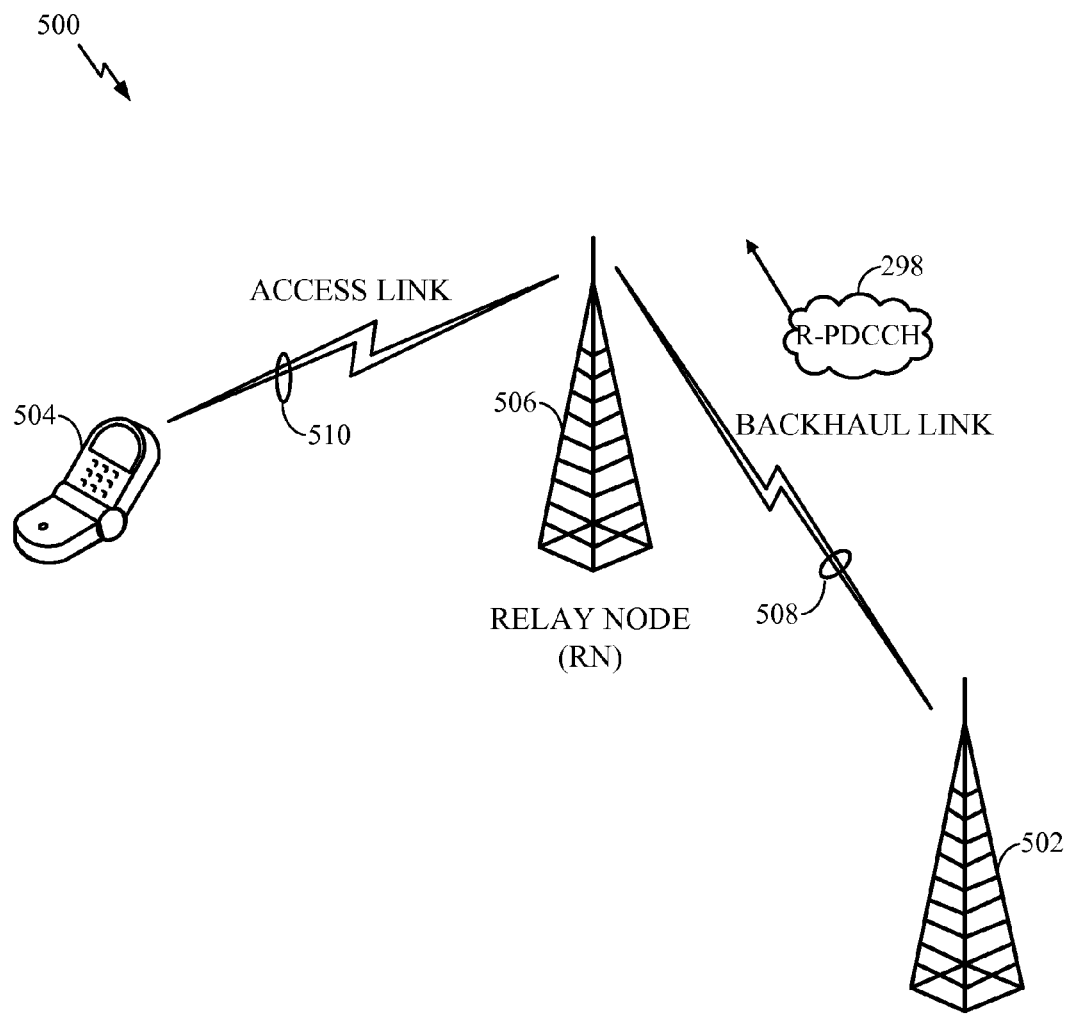
FIG. 5 illustrates an example wireless communications system with a relay base station, according to an aspect of the present disclosure.

FIG. 5 illustrates an example wireless system 500 in which certain aspects of the present disclosure may be practiced. As illustrated, the system 500 includes a donor base station (BS) 502 that communicates with user equipment (UE) 504 via a relay BS 506. The relay base station 506 may communicate with the donor BS 502 via a backhaul link 508 and with the UE 504 via an access link 510.

While a relay BS is shown in FIG. 5, those skilled in the art will appreciate that the techniques presented herein may be applied to any type of device acting as a relay node, including a user equipment (UE) acting as a relay between a donor base station and other UEs.

In other words, the relay base station 506 may receive downlink messages from the donor BS 502 over the backhaul link 508 and relay these messages to the UE 504 over the access link 510. According to aspects of the present disclosure, the donor BS 502 may transmit a Relay Physical Downlink Control Channel (R-PDCCH) 298 via the backhaul link 508 to the relay base station 506. The relay BS 506 may receive uplink messages from the UE 504 over the access link 510 and relay these messages to the donor BS 502 over the backhaul link 508.

The relay base station 506 may, thus, be used to supplement a coverage area and help fill "coverage holes." According to certain aspects, a relay BS 506 may appear to a UE 504 as a conventional BS. According to other aspects, certain types of UEs may recognize a relay BS as such, which may enable certain features.

Configuration of Reference Signals and Relay PDCCH

Certain aspects of the present disclosure may be utilized to assist a relay station in decoding a control channel. In some cases, the relay station may take advantage of the use of configurations that indicate what resources are used by a base station for special purposes, such as transmitting reference signals or muting to reduce the number of decoding candidates the relay station must consider.

As described above, relay base stations communicate with donor base stations on backhaul link subframes and with UEs on access link subframes. Relay PDCCH (R-PDCCH) generally refers to a control channel in the downlink backhaul link of relay base stations that carries both downlink and uplink related control information including, for example, downlink and uplink grants. According to some specifications, R-PDCCH design may require downlink control messages to be carried in the first slot and uplink control message to be carried in the second slot of an LTE subframe.

On certain subframes, in addition to R-PDCCH, the donor base station may also transmit various reference signals, such as channel state information-reference signals (CSI-RS).

The interleaving and particular resource elements (REs) used for transmitting R-PDCCH on subframes containing CSI-RS and subframes not containing CSI-RS may be different. Additionally, the donor base station may mute some REs on some subframes by refraining from transmitting on those REs. For example, the donor base station may mute REs corresponding to REs used to transmit CSI-RS by neighboring base stations. A donor base station may avoid transmitting R-PDCCH on muted REs. Thus, the interleaving and particular REs used for transmitting R-PDCCH on subframes with muting and subframes without muting may also be different.

For these reasons, it may be beneficial for a relay base station to know the CSI-RS and/or muting configuration of the donor base station to properly and efficiently decode R-PDCCH.

However, the CSI-RS and muting configuration may be sent to the relay base station using system information blocks (SIBs) in the data region of a subframe. According to the current design, the relay base station may need to decode the data region of the subframe to determine the configuration that indicates which subframes contain CSI-RS and/or muting and, therefore, to decode R-PDCCH. However, to determine the location of the SIBs in the data region of the subframe, the relay base station may need to decode control messages sent on the R-PDCCH.

Thus, it may be advantageous for the relay base station to utilize information about the transmission of CSI-RS and muting by a donor base station to assist in efficiently decoding control channel information. According to aspects, the relay base station may avoid the situation described above, where the CSI-RS and muting configuration, which may be used to properly and efficiently decode the R-PDCCH, is sent using SIBs, and the location of the SIBs is sent on the R-PDCCH.

Aspects of the present disclosure, however, provide methods for a relay base station to more efficiently decode R-PDCCH by determining a limited number of decoding candidates the donor base station may use for transmitting R-PDCCH, based on a configuration of REs used for transmission of reference signals or muting by the donor base station.

Figure 6:
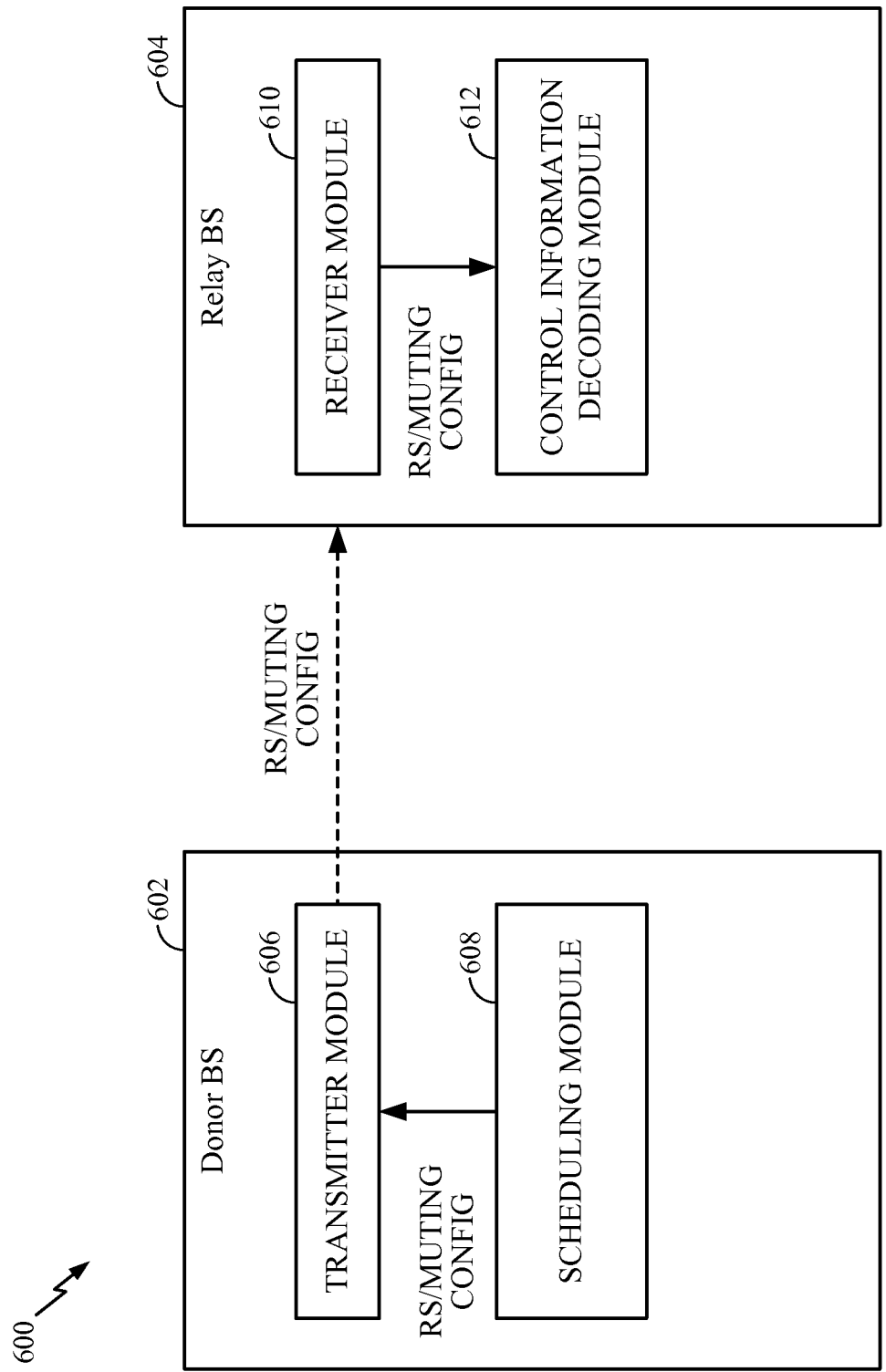
FIG. 6 illustrates an example donor base station and relay base station, according to aspects of the present disclosure.

FIG. 6 illustrates an example system 600 with a donor base station 602 and relay base station 604. The donor base station 602 may be capable of signaling a configuration of REs of a subframe used for transmission of reference signals and/or muting.

The relay base station 604, may be capable of decoding sets of REs in a data portion of the subframe, based on the configuration of reference signals, according to aspects of the present disclosure. As illustrated, the donor base station 602 may include a scheduling module 608 that determines a CSI-RS/muting configuration to be signaled to the relay base station 604, via a transmitter module 606. The configuration may be transmitted, for example, in a data portion of a subframe (e.g., PDSCH) which may be based on the configuration.

The relay base station 604 may receive the transmission, via a receiver module 610, and decode the configuration information. The configuration may be used by a control information decoding module 612 for use in determining a configuration of REs used for CSI-RS and/or muting.

The decoding module 612 may then use this information to determine sets of REs that are candidates for transmission of control information. For example, the decoding module 612 may reduce the number of R-PDCCH decoding candidates based on the assumption that REs used for reference signals and/or muting will not be used to transmit R-PDCCH.

Figure 7:
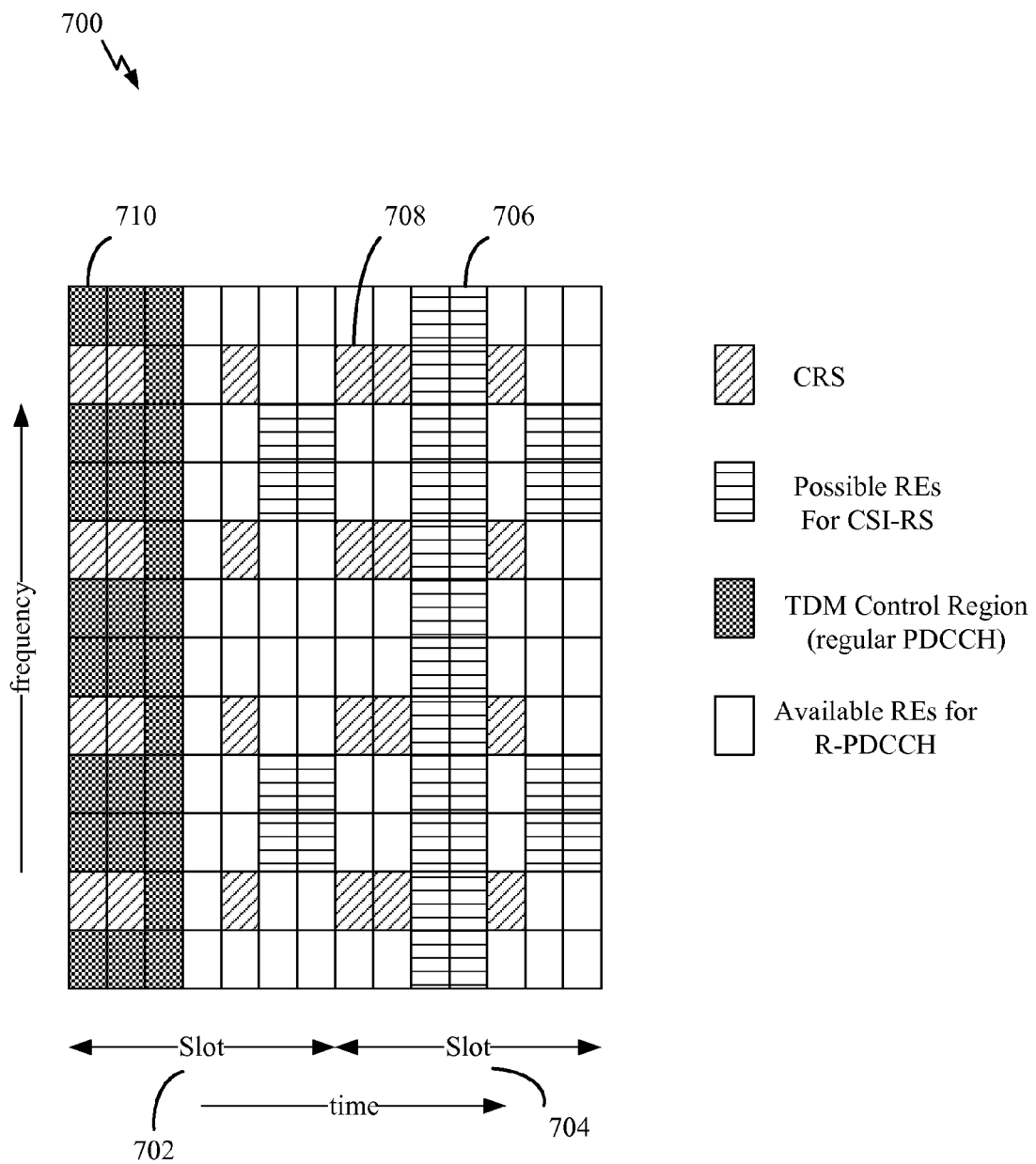
FIGS. 7-9 illustrate example subframe resource element mappings, according to an aspect of the present disclosure.

FIG. 7 illustrates an example mapping 700 of resource elements (REs) in an example subframe. As illustrated, the subframe may comprise two slots 702 and 704. The first slot 702 may include a time division multiplexed (TDM) control region 710 which may be used for transmission of regular PDCCH (intended for a UE).

As illustrated, the subframe may include common reference signals (CRS) 708 and a set of REs available for possible transmission of CSI-RS 706. According to certain aspects of the present disclosure, a relay base station may behave as a UE and decode the regular PDCCH in the TDM control region 710 and SIBs to obtain information regarding the CSI-RS and muting configuration. Based on the configuration, the relay base station may decode sets of REs available for transmission of the R-PDCCH in a data portion of a subframe. According to aspects, the CSI-RS and muting configuration may be conveyed to the relay base station on subframes which lack CSI-RS and muting. In this case, the donor base station may transmit configuration information on subframes not containing CSI-RS and muting and the relay base station may avoid blind decoding of the R-PDCCH.

According to aspects of the present disclosure, the donor base station may ensure that the relay base station is sent configuration information only on subframes lacking CSI-RS and muting. In such a design the relay base station attempts to decode R-PDCCH on all subframes assuming that the subframes do not contain CSI-RS and muting before the relay base station obtains the CSI-RS and muting configuration. Once the relay obtains the CSI-RS configuration, it can use rate matching corresponding to the subframe, that is rate matching for a subframe is determined based on whether the subframe contains CSI-RS and muted REs and which REs are muted and contain CSI-RS etc.

Alternately, the relay base station may utilize multiple attempts to decode R-PDCCH corresponding to different configurations of CSI-RS and muting. For example, the relay base station may attempt to decode R-PDCCH using rate matching configuration corresponding to subframes that have no CRI-RS and no muting, using rate matching configuration corresponding subframes that have CSI-RS and no muting, using rate matching configuration corresponding to subframes that have muting and no CSI-RS, and/or using rate mating configuration corresponding to subframes that have CSI-RS and muting. It should be noted that there may be multiple rate matching configurations for each of the cases listed above as there may be different patterns for CSI-RS and muted REs within a subframe.

In some cases, in an effort to reduce the number of hypotheses (candidate sets of REs) that the relay base station may consider to try to decode the R-PDCCH, the donor base station may refrain from transmitting R-PDCCH on any REs that may be configured to contain CSI-RS or muting. Further, since R-PDCCH is a downlink related message, the donor base station may only need to avoid transmitting the R-PDCCH on REs in the first slot 702 that may be configured to contain CSI-RS or muting.

Figure 8:
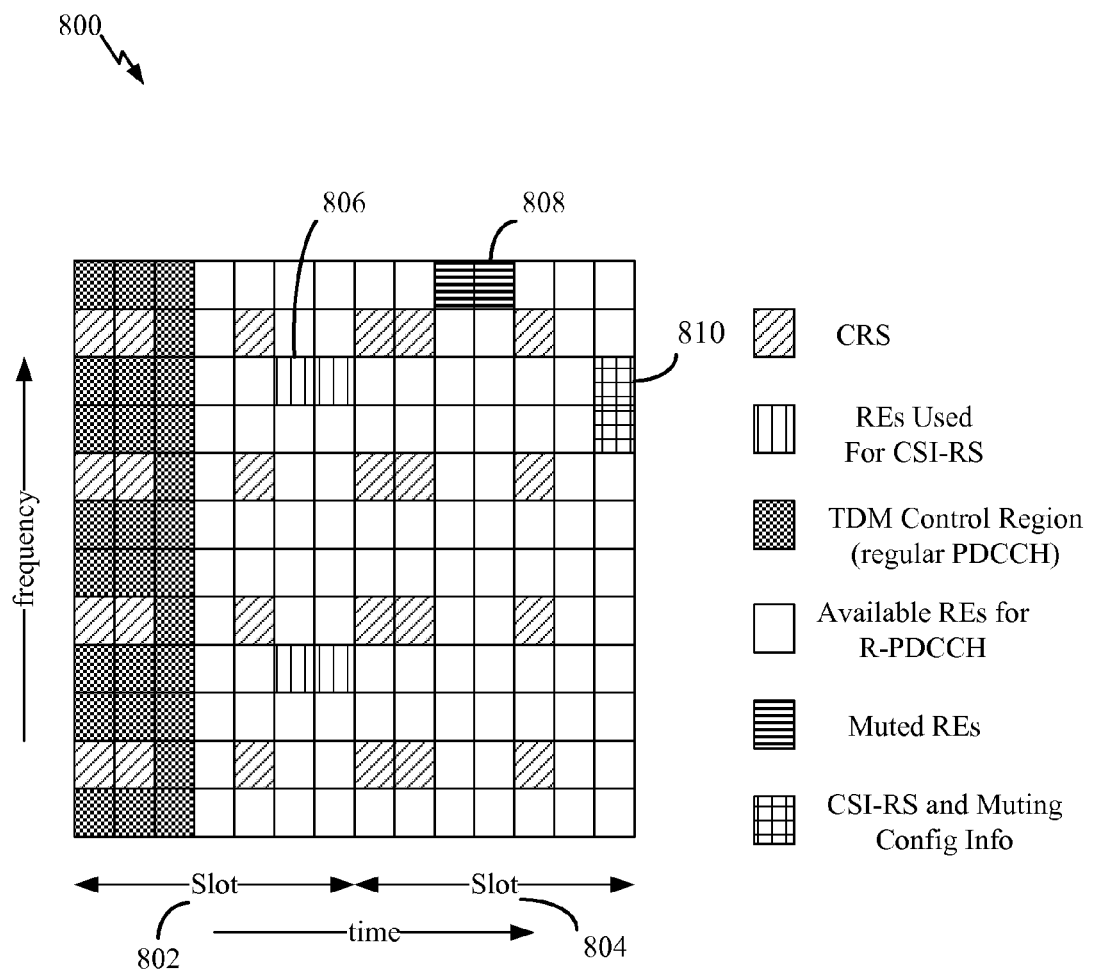

FIG. 8 illustrates an example mapping 800 of resource elements (REs) for transmitting CSI-RS and muting by a donor base station with four antenna ports. By comparison with FIG. 7, it may be seen that from the REs available for CSI-RS transmissions, four REs 806 are actually used (one for each antenna port). In addition, in the illustrated example, muting is performed on two of the REs 808 available for R-PDCCH transmissions (e.g., as these REs may be used by neighboring base stations for CSI-RS transmissions).

According to aspects of the present disclosure, the CSI-RS and muting configuration may be conveyed to a relay base station in a predetermined set of resources, such as REs 810, where a resource may be identified, for example, by a subframe number, OFDM symbol index, subcarrier index, etc. The predetermined set of resources may be in either slot 802 or 804, or may span the two. By receiving configuration information in a predetermined set of resources, the relay base station may be able to obtain the configuration information and utilize the information regarding REs used for CSI-RS and/or muting to assist in decoding the R-PDCCH.

According to aspects, the donor base station may avoid transmitting R-PDCCH on REs 806 that are actually used for CSI-RS transmission and REs 808 where the donor base station is muting by refraining from transmission. Once the relay base station obtains CSI-RS and muting configuration information, the relay base station may decode sets of REs available for R-PDCCH transmission in a data portion of a subframe.

Figure 9:
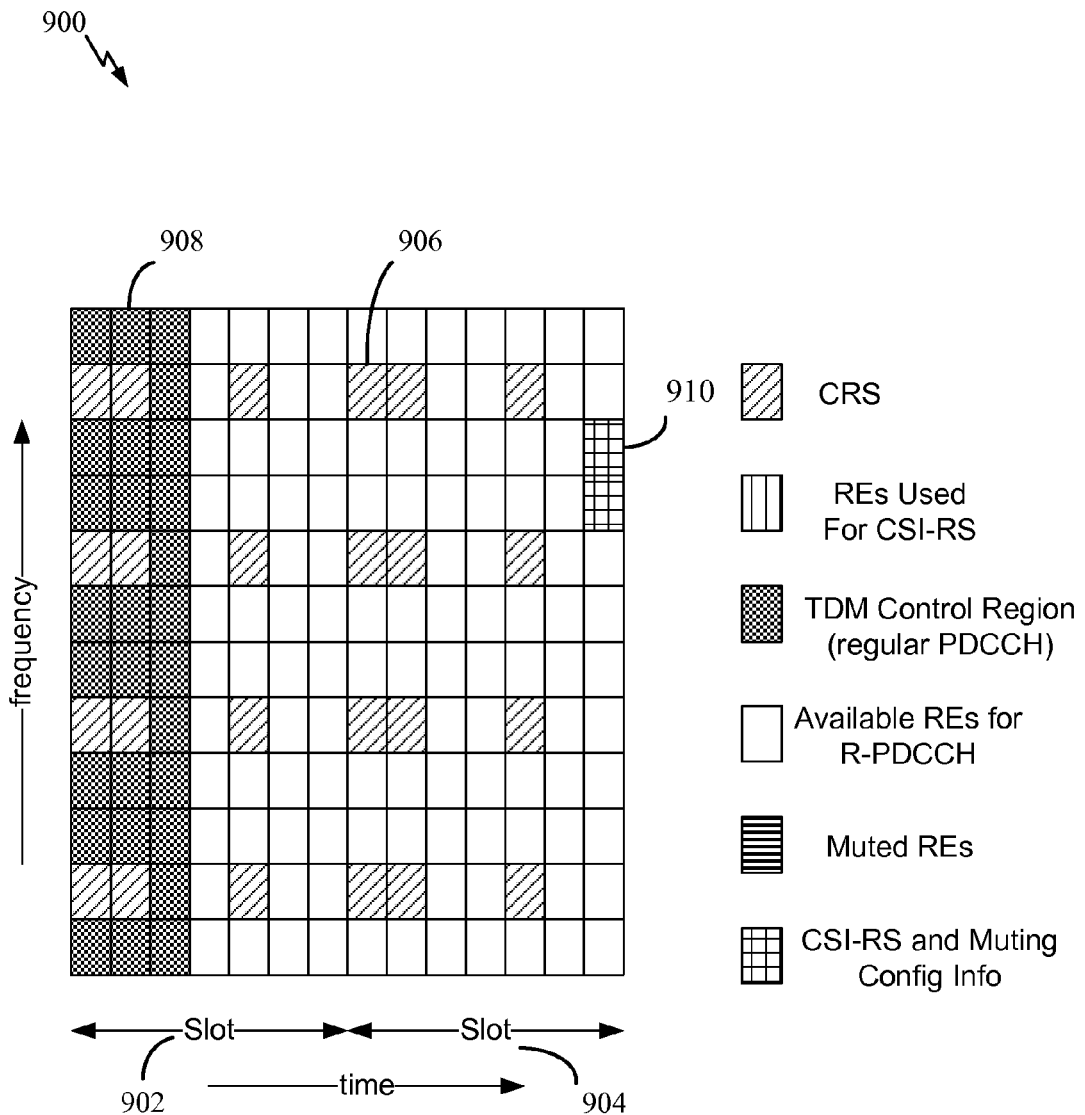

FIG. 9 illustrates an example mapping 900 of resource elements (REs) without CSI-RS or muting by the donor base station. As noted above, the subframe may include REs for CRS 906 and a TDM control region 908 where the regular PDCCH may be transmitted. In this case, a relay base station may decode sets of REs available for transmission of R-PDCCH based on information regarding the location of the CRS 906 and the TDM control region 908. Again, the CSI-RS and muting configuration may be conveyed to the relay base station in a predetermined set of resources, for example, REs 910, which may be in either slot 902 or 904, or may span the two.

Figure 10:
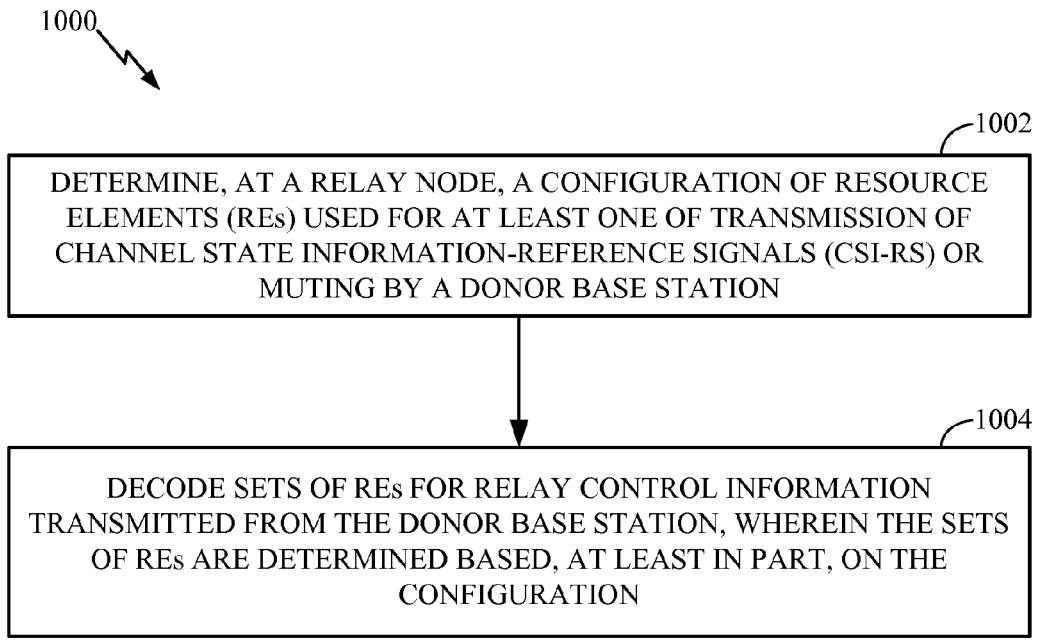
FIG. 10 illustrates example operations that may be performed by a relay base station, according to aspects of the present disclosure.

FIG. 10 illustrates example operations 1000 which may be performed, for example, by a relay base station, to more efficiently decode relay control information according to aspects of the present disclosure. At 1002, a relay base station may determine a configuration of resource elements (REs) used for at least one of transmission of CSI-RS or muting by a donor base station. At 1004, the relay base station may decoding sets of REs for relay control information transmitted from the donor base station, wherein the sets of REs are determined based, at least in part, on the configuration.

Figure 11:
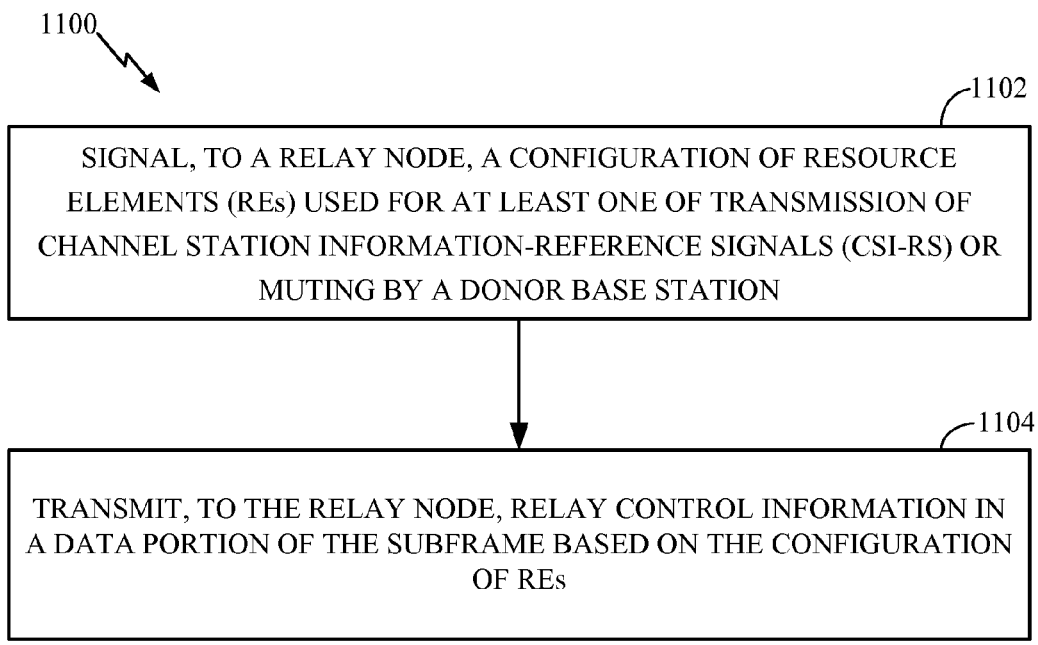
FIG. 11 illustrates example operations that may be performed by a donor base station, according to aspects of the present disclosure.

FIG. 11 illustrates example operations 1100 which may be performed, for example by a donor base station to help a relay base station more efficiently decode relay control information according to aspects of the present disclosure. At 1102, a donor base station may signal, to a relay node, a configuration of resource elements (REs) used for at least one of transmission of CSI-RS or muting by a donor base station. At 1104, the donor base station may transmit, to the relay node, relay control information in a data portion of the subframe based on the configuration of REs.

As described above, in some cases, when searching for R-PDCCH a relay base station may not consider decoding candidates that contain any REs that are actually used for CSI-RS transmissions and/or muting. In some cases, the relay base station may not even consider decoding candidates that contain any REs that are available for CSI-RS transmissions and/or muting.

As described above, in scenarios where DL related control messages are limited to the first slot (and R-PDCCH is considered a DL related control message), it may be sufficient to only avoid REs in the first slot that could contain CSI-RS and/or muting. As an alternative, base stations that are serving relays may avoid CSI-RS configuration and/or muting configuration that involve REs in the first slot.

In some scenarios, re-configuration of the resources used for CSI-RS and/or muting may present an issue in that a relay base station may rely on a configuration that is no longer current. To address this scenario, according to aspects, CSI-RS re-configuration may be performed in backhaul subframes without CSI-RS. As an alternative, CSI-RS re-configuration may be performed in backhaul subframes having the same CSI-RS before and after the reconfiguration, such that the re-configuration may have no impact on decoding efficiency.

As described above, the techniques provide herein may allow a relay base station to more efficiently decode control information by limiting a number of decoding candidates the relay base station must consider.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for wireless communication, comprising:
determining, at a relay node, a configuration of resource elements (REs) used for at least one of transmission of channel state information-reference signals (CSI-RS) or muting by a donor base station, wherein determining the configuration comprises decoding configuration information transmitted by the donor base station at a predetermined set of resources known at the relay node and the donor base station; and
decoding sets of REs for relay control information transmitted from the donor base station, wherein the sets of REs are determined based, at least in part, on the configuration.

2. The method of claim 1, wherein determining the configuration comprises:
determining sets of REs where CSI-RS are not transmitted by the donor base station.

3. The method of claim 1, wherein determining the configuration comprises:
determining REs where the donor base station is not muting by refraining from transmission.

4. The method of claim 1, wherein determining the configuration comprises:
decoding one or more system information blocks (SIBs).

5. The method of claim 4, wherein a location of the one or more SIBs is determined by decoding a first control channel different from a second control channel used to obtain information about another data transmission.

6. The method of claim 5, wherein the first control channel is a Physical Downlink Control Channel (PDCCH) and wherein the second control channel is a Relay-Physical Downlink Control Channel (R-PDCCH).

7. The method of claim 1, wherein determining the configuration comprises the relay node using procedures used by a user equipment (UE) to obtain such a configuration.

8. The method of claim 1, wherein determining the configuration comprises:
decoding configuration information using rate matching corresponding to subframes which lack at least one of CSI-RS or muted REs.

9. The method of claim 8, wherein different rate matching schemes are used for at least one of control or data transmission that have to be decoded by the relay node before and after the relay node is expected to have the configuration information.

10. The method of claim 8, wherein determining the configuration comprises:
decoding configuration information using rate matching corresponding to subframes which lack CSI-RS and muted REs.

11. The method of claim 1, wherein determining the configuration comprises:
decoding configuration information using at least two different rate matching configurations corresponding to at least two different configurations of at least one of CSI-RS or muting.

12. An apparatus for wireless communication, comprising:
means for determining, at a relay node, a configuration of resource elements (REs) used for at least one of transmission of channel state information-reference signals (CSI-RS) or muting by a donor base station, wherein determining the configuration comprises decoding configuration information transmitted by the donor base station at a predetermined set of resources known at the relay node and the donor base station; and
means for decoding sets of REs for relay control information transmitted from the donor base station, wherein the sets of REs are determined based, at least in part, on the configuration.

13. The apparatus of claim 12, wherein the means for determining the configuration comprises:
means for determining sets of REs where CSI-RS are not transmitted by the donor base station.

14. The apparatus of claim 12, wherein the means for determining the configuration comprises:
means for determining REs where the donor base station is not muting by refraining from transmission.

15. The apparatus of claim 12, wherein the means for determining the configuration comprises:
means for decoding one or more system information blocks (SIBs).

16. The apparatus of claim 15, wherein a location of the one or more SIBs is determined by decoding a first control channel different from a second control channel used to obtain information about another data transmission.

17. The apparatus of claim 16, wherein the first control channel is a Physical Downlink Control Channel (PDCCH) and wherein the second control channel is a Relay-Physical Downlink Control Channel (R-PDCCH).

18. The apparatus of claim 12, wherein the means for determining the configuration comprises the relay node using procedures used by a user equipment (UE) to obtain such a configuration.

19. The apparatus of claim 12, wherein the means for determining the configuration comprises:
means for decoding configuration information using rate matching corresponding to subframes which lack at least one of CSI-RS or muted REs.

20. The apparatus of claim 19, wherein different rate matching schemes are used for at least one of control or data transmission that have to be decoded by the relay node before and after the relay node is expected to have the configuration information.

21. The apparatus of claim 19, wherein the means for determining the configuration comprises:
means for decoding configuration information using rate matching corresponding to subframes which lack CSI-RS and muted REs.

22. The apparatus of claim 12, wherein the means for determining the configuration comprises:
means for decoding configuration information using at least two different rate matching configurations corresponding to at least two different configurations of at least one of CSI-RS or muting.

23. An apparatus for wireless communication, comprising:
at least one processor adapted to:
determine, at a relay node, a configuration of resource elements (REs) used for at least one of transmission of channel state information-reference signals (CSI-RS) or muting by a donor base station, wherein the at least one processor is adapted to determine by decoding configuration information transmitted by the donor base station at a predetermined set of resources known at the relay node and the donor base station; and
decode sets of REs for relay control information transmitted from the donor base station, wherein the sets of REs are determined based, at least in part, on the configuration; and
a memory coupled to the at least one processor.

24. The apparatus of claim 23, wherein the at least one processor adapted to determine the configuration comprises:
determining sets of REs where CSI-RS are not transmitted by the donor base station.

25. The apparatus of claim 23, wherein the at least one processor adapted to determine the configuration comprises:
determining REs where the donor base station is not muting by refraining from transmission.

26. The apparatus of claim 23, wherein the at least one processor adapted to determine the configuration comprises:
decoding one or more system information blocks (SIBs).

27. The apparatus of claim 26, wherein a location of the one or more SIBs is determined by decoding a first control channel different from a second control channel used to obtain information about another data transmission.

28. The apparatus of claim 27, wherein the first control channel is a Physical Downlink Control Channel (PDCCH) and wherein the second control channel is a Relay-Physical Downlink Control Channel (R-PDCCH).

29. The apparatus of claim 23, wherein the at least one processor adapted to determine the configuration comprises the relay node using procedures used by a user equipment (UE) to obtain such a configuration.

30. The apparatus of claim 23, wherein the at least one processor adapted to determine the configuration comprises:
decoding configuration information using rate matching corresponding to subframes which lack at least one of CSI-RS or muted REs.

31. The apparatus of claim 30, wherein different rate matching schemes are used for at least one of control or data transmission that have to be decoded by the relay node before and after the relay node is expected to have the configuration information.

32. The apparatus of claim 30, wherein the at least one processor adapted to determine the configuration comprises:

decoding configuration information using rate matching corresponding to subframes which lack CSI-RS and muted REs.

33. The apparatus of claim 23, wherein the at least one processor adapted to determine the configuration comprises:
  decoding configuration information using at least two different rate matching configurations corresponding to at least two different configurations of at least one of CSI-RS or muting.

34. A computer-program product comprising a non-transitory computer readable medium having instructions stored thereon, the instructions executable by one or more processors for:
  determining, at a relay node, a configuration of resource elements (REs) used for at least one of transmission of channel state information-reference signals (CSI-RS) or muting by a donor base station, wherein determining the configuration comprises decoding configuration information transmitted by the donor base station at a predetermined set of resources known at the relay node and the donor base station; and
  decoding sets of REs for relay control information transmitted from the donor base station, wherein the sets of REs are determined based, at least in part, on the configuration.

35. The computer-program product of claim 34, wherein determining the configuration comprises:
  determining sets of REs where CSI-RS are not transmitted by the donor base station.

36. The computer-program product of claim 34, wherein determining the configuration comprises:
  determining REs where the donor base station is not muting by refraining from transmission.

37. The computer-program product of claim 34, wherein determining the configuration comprises:
  decoding one or more system information blocks (SIBs).

38. The computer-program product of claim 37, wherein a location of the one or more SIBs is determined by decoding a first control channel different from a second control channel used to obtain information about another data transmission.

39. The computer-program product of claim 38, wherein the first control channel is a Physical Downlink Control Channel (PDCCH) and wherein the second control channel is a Relay-Physical Downlink Control Channel (R-PDCCH).

40. The computer-program product of claim 34, wherein determining the configuration comprises the relay node using procedures used by a user equipment (UE) to obtain such a configuration.

41. The computer-program product of claim 34, wherein determining the configuration comprises:
  decoding configuration information using rate matching corresponding to subframes which lack at least one of CSI-RS or muted REs.

42. The computer-program product of claim 41, wherein different rate matching schemes are used for at least one of control or data transmission that have to be decoded by the relay node before and after the relay node is expected to have the configuration information.

43. The computer-program product of claim 41, wherein determining the configuration comprises:
  decoding configuration information using rate matching corresponding to subframes which lack CSI-RS and muted REs.

44. The computer-program product of claim 34, determining the configuration comprises:
  decoding configuration information using at least two different rate matching configurations corresponding to at least two different configurations of at least one of CSI-RS or muting.

* * * * *